US006311380B1

(12) United States Patent
Chen

(10) Patent No.: US 6,311,380 B1
(45) Date of Patent: Nov. 6, 2001

(54) DEVICE FOR MOUNTING BEARINGS ONTO A SHAFT

(76) Inventor: Yu-Lin Chen, No. 539-21 Chung-Shan Rd., Chingshui Town, Taichung Hsien (TW)

(*) Notice: Subject to any disclaimer, the term of this patent is extended or adjusted under 35 U.S.C. 154(b) by 0 days.

(21) Appl. No.: 09/460,405

(22) Filed: Dec. 13, 1999

(51) Int. Cl.[7] ........ B23P 19/04
(52) U.S. Cl. ........ 29/259
(58) Field of Search ........ 29/259–266

(56) References Cited

U.S. PATENT DOCUMENTS

H1349 * 9/1994 Kelley ........ 29/263
1,804,843 * 5/1931 Santiago ........ 29/262
2,036,782 * 4/1936 Ullmo ........ 29/263
2,052,304 * 8/1936 Kaplan ........ 29/262
2,821,777 * 2/1958 Keister ........ 29/259
3,340,593 * 9/1967 Savastano ........ 29/262
3,551,988 * 1/1971 Berbel et al. ........ 29/259
3,568,294 * 3/1971 Conner ........ 29/259
4,059,883 * 11/1977 Osborne ........ 29/263

* cited by examiner

*Primary Examiner*—Robert C. Watson

(57) ABSTRACT

A device for mounting a bearing onto a shaft includes a tubular pushing member having three wings extending radially outward therefrom. Each of the wings has a rod slidably and perpendicularly connected thereto so as to contact the bearing on the shaft. A threaded rod extends through a passage in the pushing member and an engaging device is on a first end of the threaded rod so as to engage with the shaft. A rotatable member rotatably contacts the pushing member and is threaded mounted to a second end of the threaded rod so that the pushing member together with the rods are moved to push the bearing by rotating the rotatable member.

10 Claims, 12 Drawing Sheets

DEVICE FOR MOUNTING BEARINGS ONTO A SHAFT

FIELD OF THE INVENTION

The present invention relates to a device for mounting bearings on a shaft. The device includes a pushing member with a threaded rod extending through the pushing member and the threaded rod is connected to a shaft on which a bearing is mounted. A rotatable member is threadedly engaged with the threaded rod and the pushing member contacts the bearing so that the pushing member is moved to push the bearing by rotating the rotatable member.

BACKGROUND OF THE INVENTION

FIG. 1 shows a conventional bearing puller which is used to pull a bearing from a shaft. However, there is a lack for providing a tool to easily mount bearings onto a shaft. A conventional way to mount bearings to a shaft is illustrated in FIG. 2, wherein the bearing 100 is first mounted to an end of the shaft 101, and the operator uses wood or plastic mallets or hammers 102 to hit the bearing 100 so that the bearing 100 is moved inch by inch to be located to a desired position on the shaft 101. It takes a lot of time and cannot precisely position the bearing 100 onto the shaft 101. Besides, the bearing 100 could be damaged. Some hydraulic machines are used to push bearings onto a shaft. These hydraulic machines can only to engage with bearings that have specific specifications and the machines are expensive.

The present invention intends to provide a device to mount bearings onto a shaft by continuously rotating a rotatable member.

SUMMARY OF THE INVENTION

In accordance with one aspect of the present invention, there is provided a device for mounting bearings onto a shaft. The device comprises a tubular pushing member which has three wings extending radially outward therefrom. Each of the wings has a rod slidably and perpendicularly connected thereto. The tubular pushing member has a passage and an annular flange extends radially inward from an inside of the passage. A threaded rod extends through the passage. An engaging means is on a first end of the threaded rod and is adapted to be connected to the shaft. A rotatable member rotatably contacts the pushing member and is threaded mounted to a second end of the threaded rod.

The object of the present invention is to provide a device that pushes bearings onto a shaft by continuously rotating a rotatable member.

Another object of the present invention is to provide a device that the pushing member has three adjustable rods which are used to push bearings having different sizes.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 7:
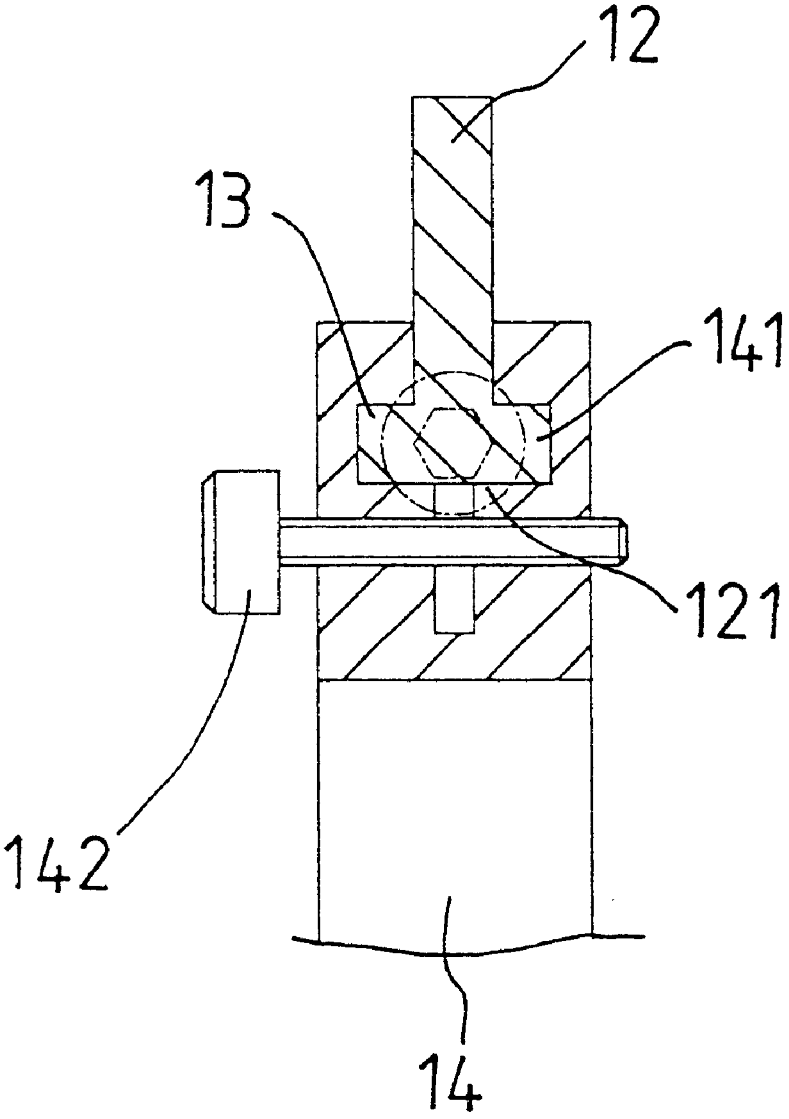
FIG. 7 shows that a bolt extends through the two partitions separated by a slot of each rod so as to clamp the flanges of the wing.

Referring to FIGS. 3, 4, 5 and 10, the device for mounting bearings onto a shaft in accordance with the present invention comprises a tubular pushing member 10 having three wings 12 extending radially outward therefrom. A passage 11 is defined through the pushing member 10 and an annular flange 110 extends radially inward from an inside of the passage 11. Each of the wings 12 has two flanges 13 extending laterally therefrom and a rod 14 is slidably and perpendicularly connected to the flanges 13. Each of the rods 14 has a slot defined in a top thereof, two side recesses 141 respectively defined in two inner sides defining the slot so that the two flanges 13 are received in the two side recesses 141. An end member 121 is engaged with a distal end of each of the wings 12 to prevent each of the rods 14 from disengaging from the wings 12. A biasing member 145 is received between the flanges 13 and a bottom defining the slot of each of the rods 14 and a ring is connected to the biasing member 145 so that the two partitions clamp the wing 12 and the biasing force enhances the combination between the rod 14 and a bottom of the two flanges 13. As shown in FIG. 7, a bolt 142 extends through two partitions separated by the slot of each of the rods 14 so that the two partitions clamp respective one of the wings 12.

Figure 1:
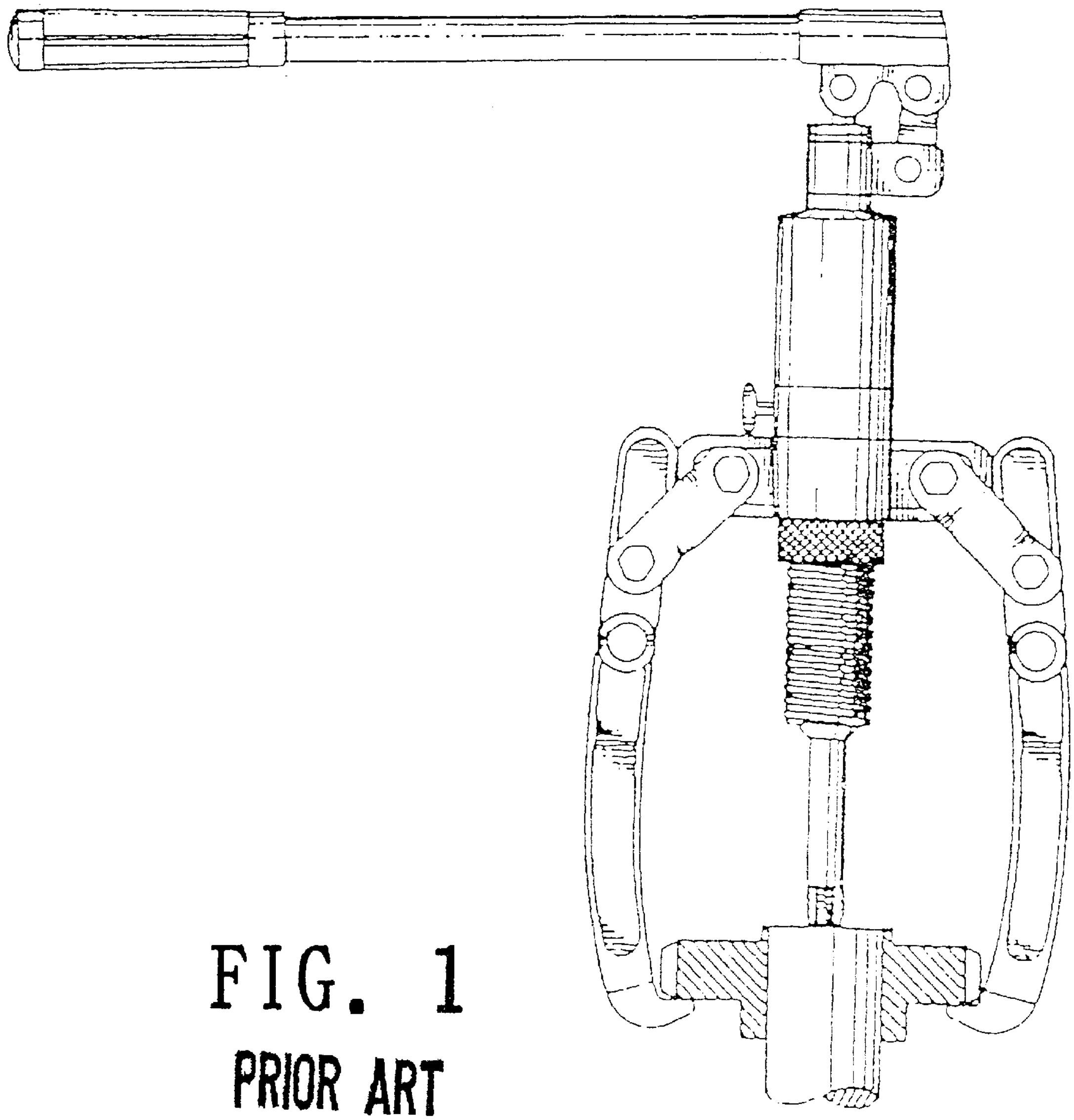
FIG. 1 PRIOR ART
FIG. 1 shows a conventional bearing puller.
Figure 2:
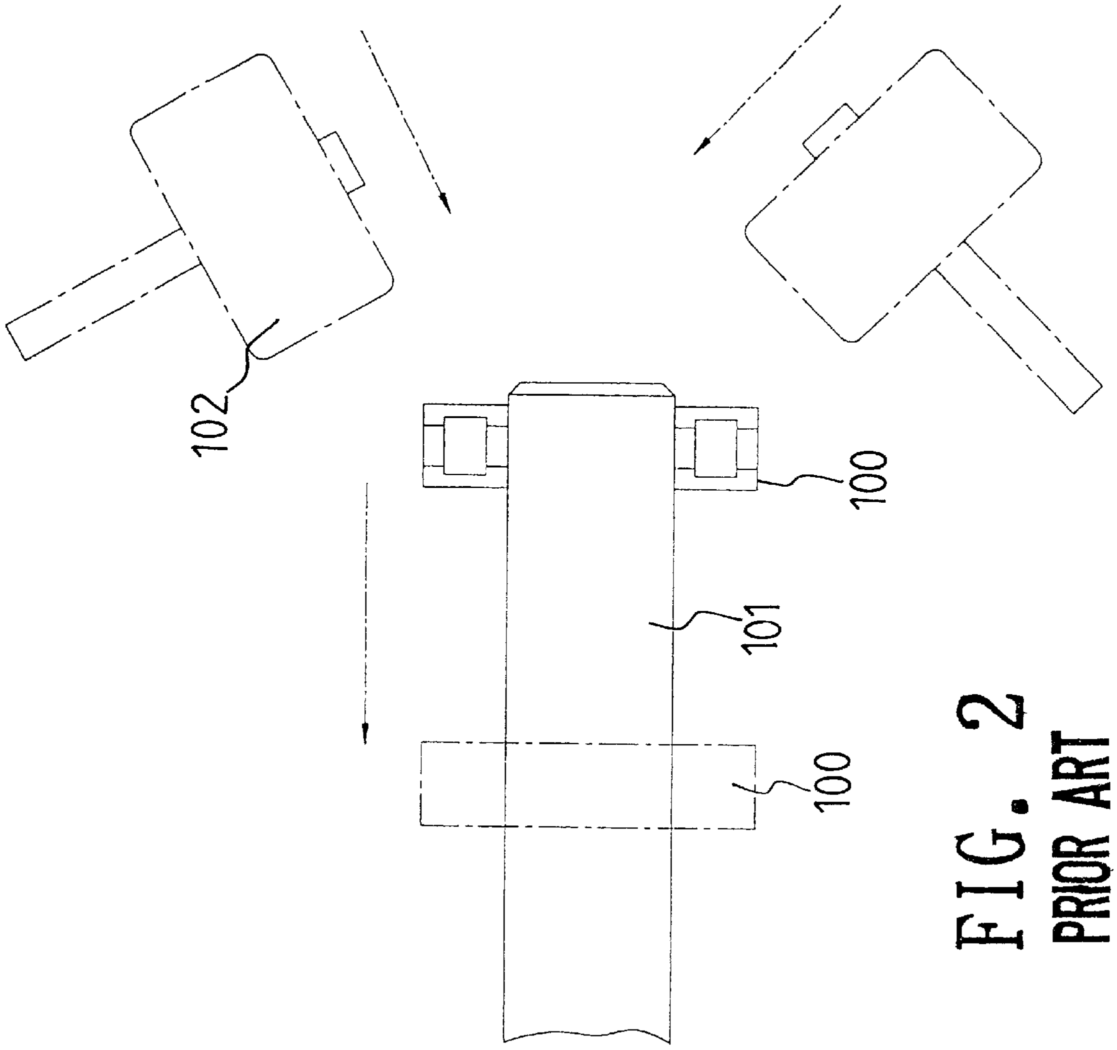
FIG. 2 PRIOR ART
FIG. 2 illustrates a bearing is conventionally mounted to a shaft by mallets or hammers.
Figure 3:
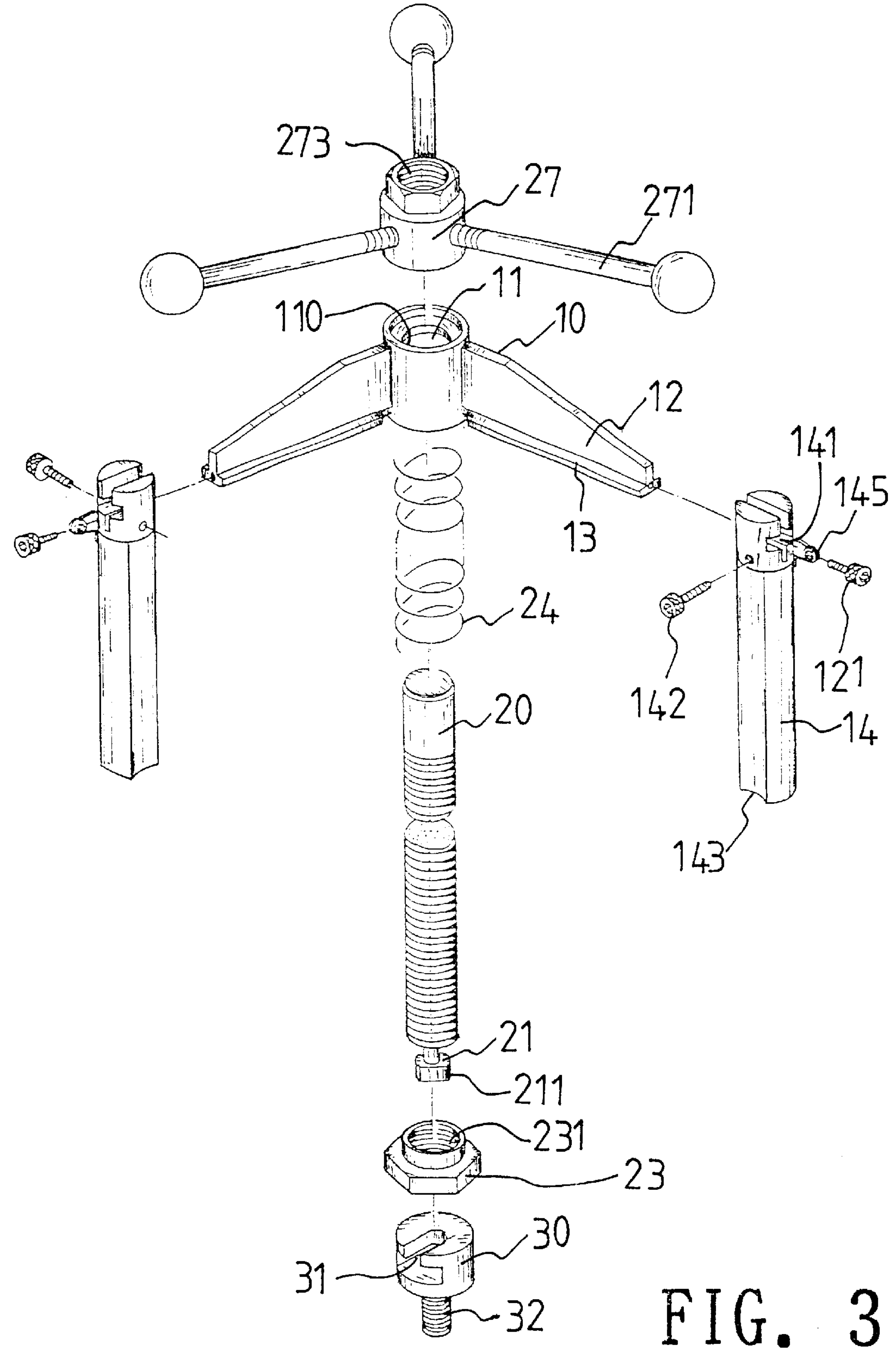
FIG. 3 is an exploded view to show the device for mounting a bearing onto a shaft in accordance with the present invention.
Figure 4:
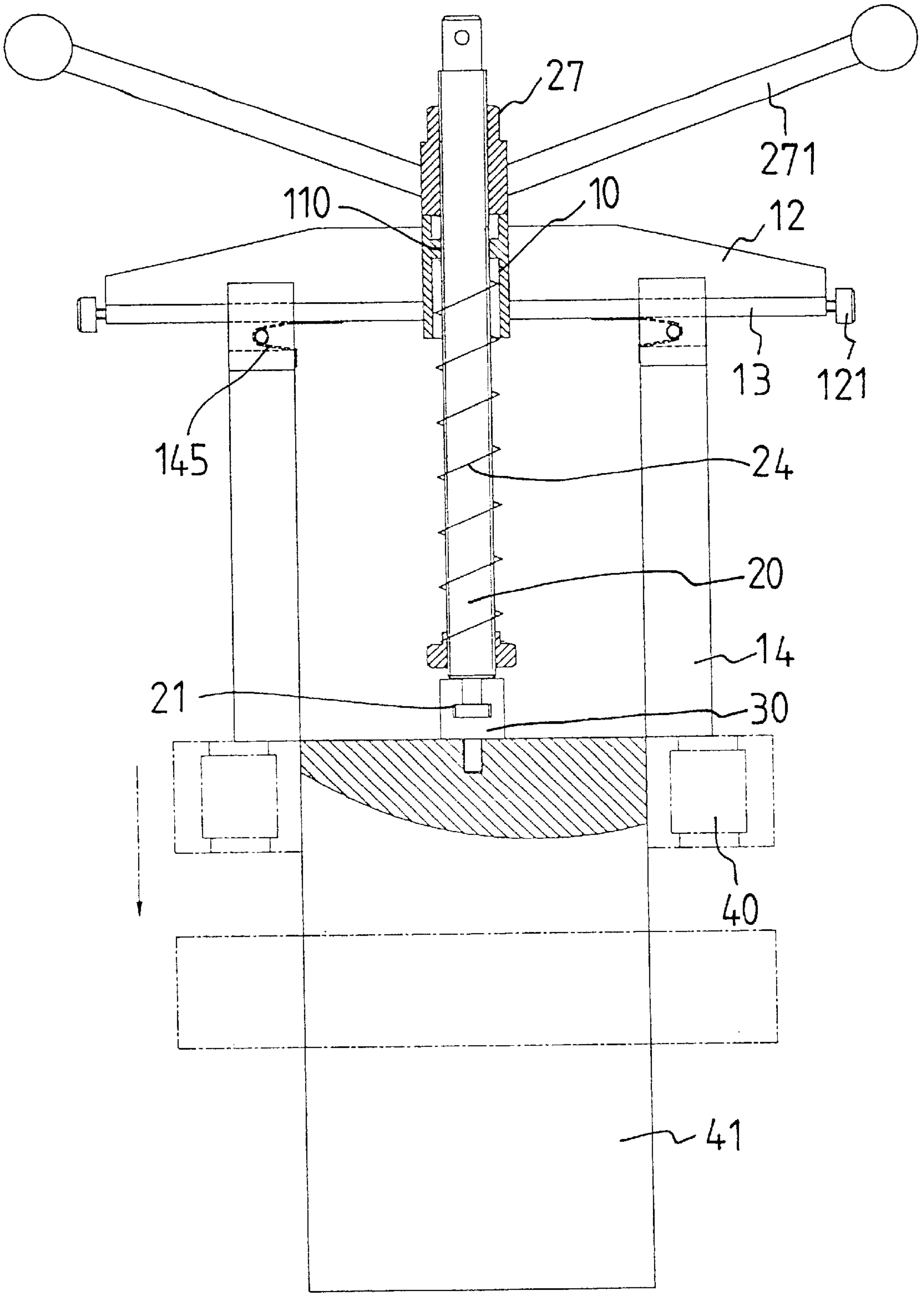
FIG. 4 is a cross-sectional view to show the device of the present invention pushing a bearing on a shaft.
Figure 5:
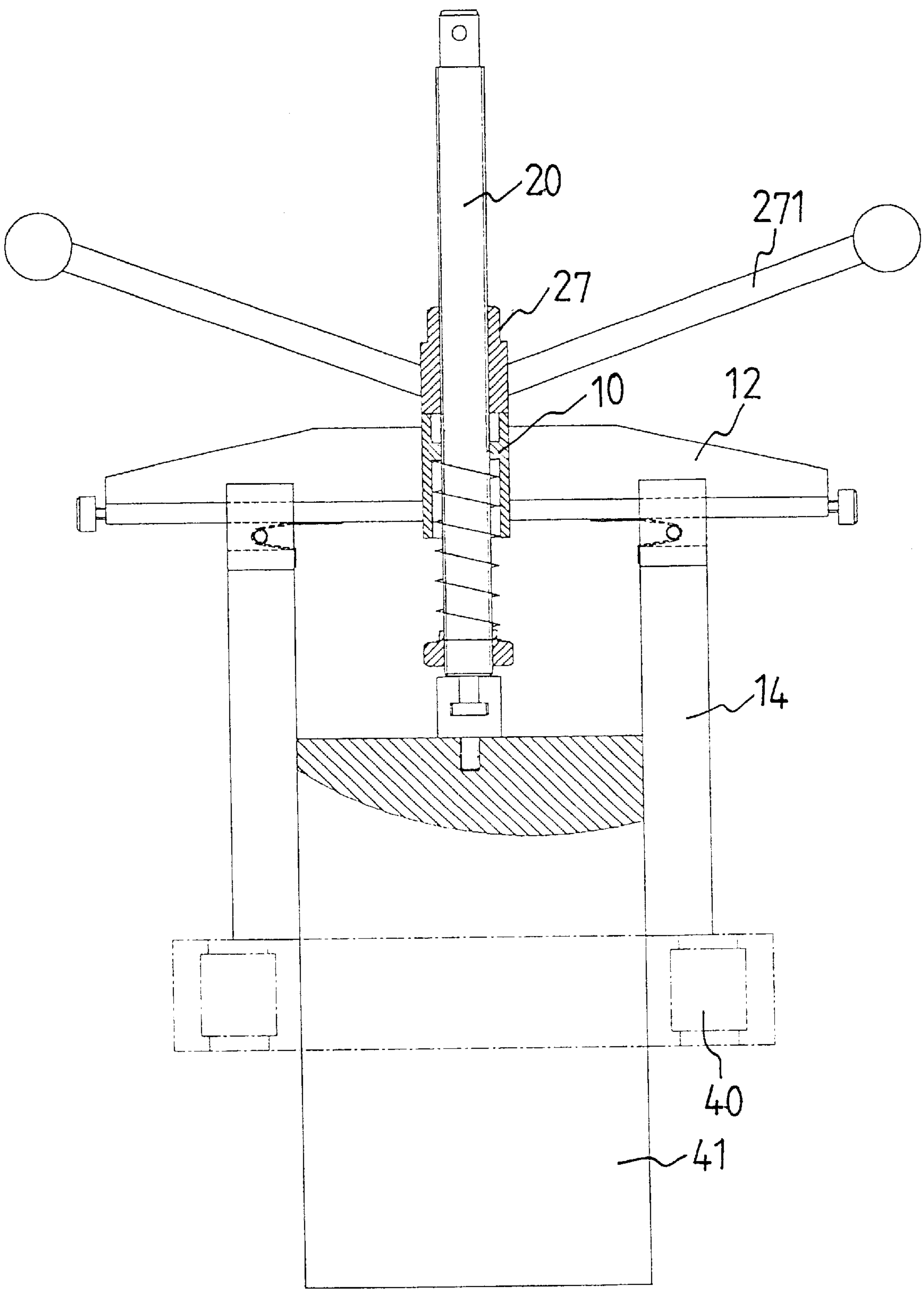
FIG. 5 is a cross-sectional view to show the bearing on the shaft is pushed along the shaft by rotating the rotatable member of the present invention.
Figure 6:
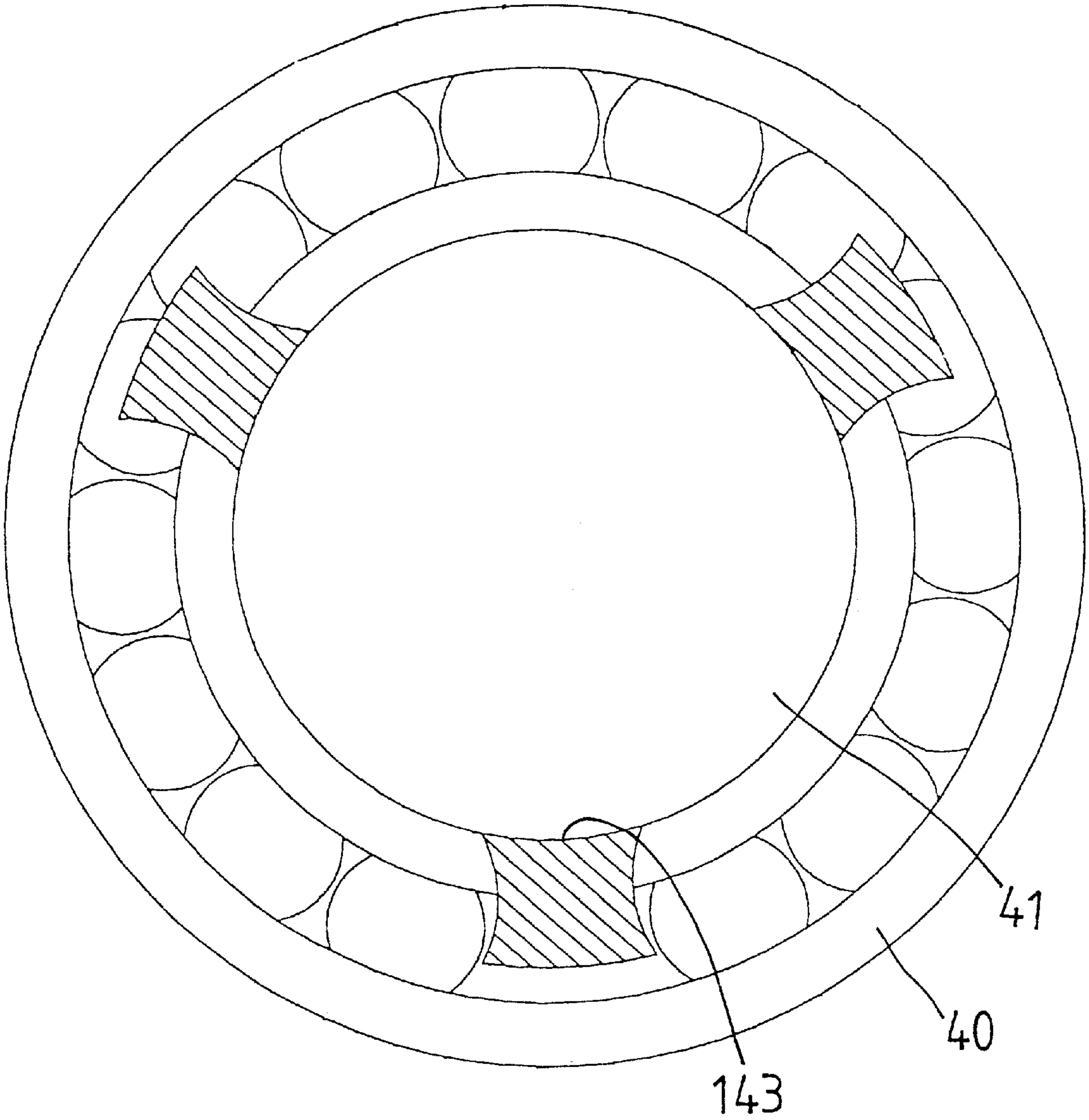
FIG. 6 shows that each rod extending from the pushing member has a curved inside so as to engage with the bearing.

A threaded rod 20 extends through the passage 11 and an engaging means on a first end of the threaded rod 20 is connected to the shaft 41. A nut 23 is threadedly connected to the first end of the threaded rod 20 and a spring 24 is urged between the annular flange 110 and the nut 23. The engaging means includes a first part 21 connected to the first end of the threaded rod 20 and a second part 30 is connected to the shaft 41. The first part 21 having a head 211 and the second part 30 having a concavity 31 defined radially therein so as to receive the head 21 in the concavity 31. The second part 30 has a threaded portion 32 so as to fixedly engage with the shaft 41. A bearing 40 is mounted to the shaft 41 and the three rods 14 contact the bearing 40. It is to be noted that each of the rods 14 has a curved inside 143 which contacts the circular outside of the shaft 41 as shown in FIG. 6.

A rotatable member 27 includes a tube portion which has a threaded inside 173 and three bars 271 extend radially outward from the tube portion. The rotatable member 27 rotatably contacts the pushing member 10 and a second end of the threaded rod 20 is threadedly engaged with the threaded inside 173.

The pushing member 10 and the rods 14 are moved to push the bearing 40 along the shaft 41 by rotating the rotatable member 27. Because of the threading engagement between the threaded rod 20 and the rotatable member 27, when the rotatable member 27 is continuously rotated, the bearing 40 is pushed to its desired position.

Figure 8:
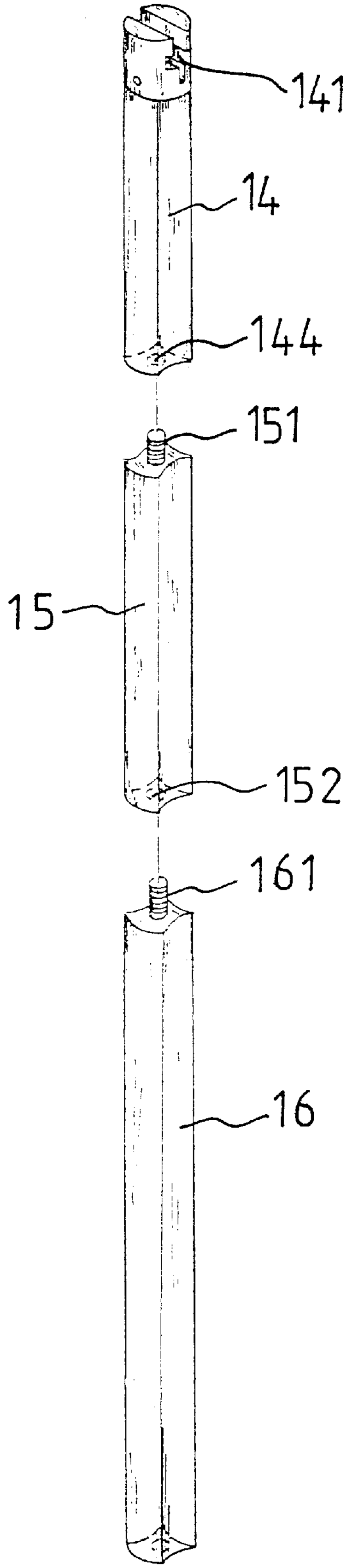
FIG. 8 shows that each rod of the device can be extended by connecting extension rods.

FIG. 8 shows that the length of the rod 14 can be extended by adding extension rods 15, 16 to the rod 14. The extension rod 15 has a threaded portion 151 on one end thereof so as to engaged with a threaded recess 144 in the rod 14. The extension rod 16 has a threaded portion 161 on one end thereof so as to engaged with a threaded recess 152 in the extension rod 15.

Figure 9:
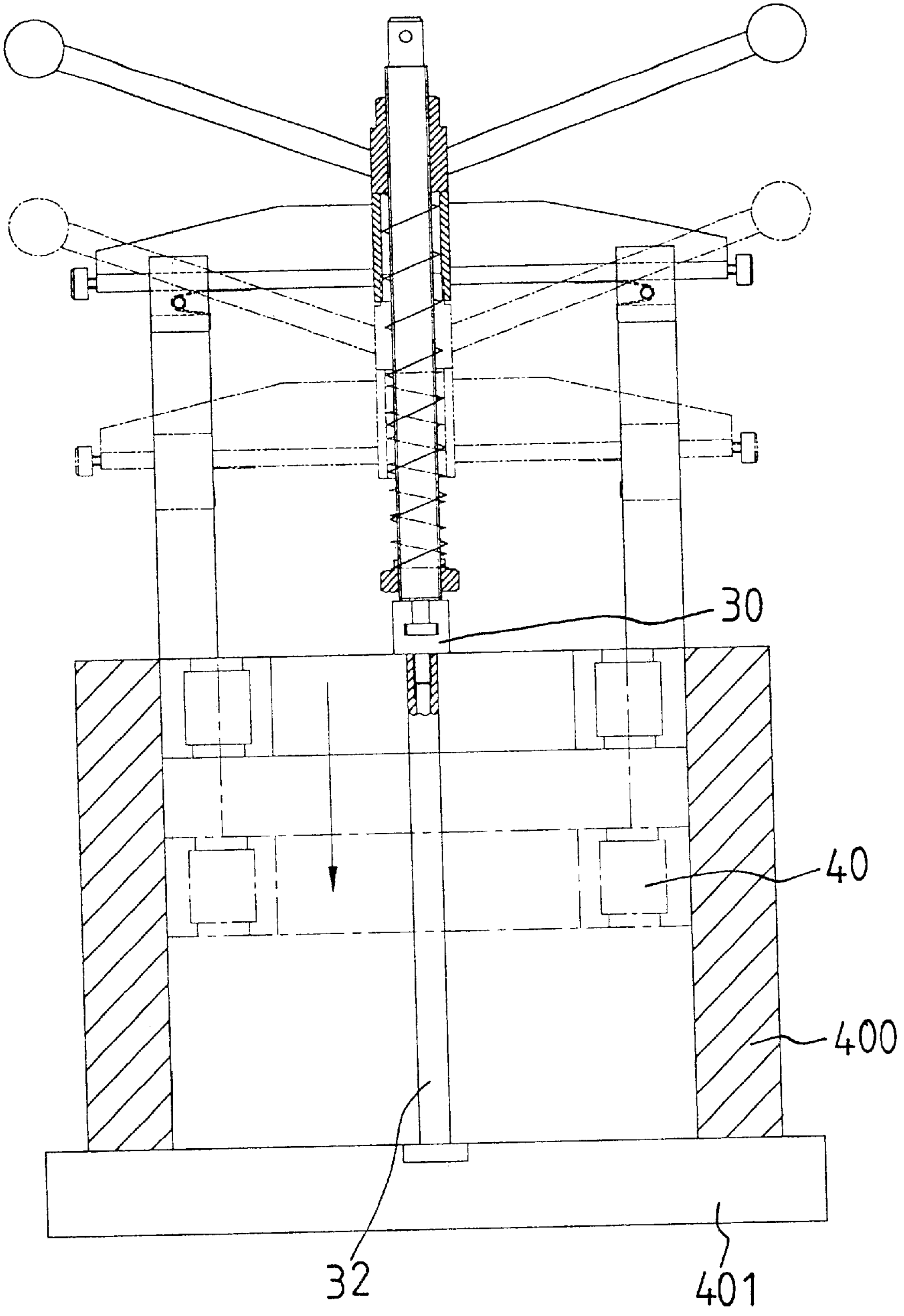
FIG. 9 shows that the device of the present invention pushes the bearing in a tube.
Figure 10:
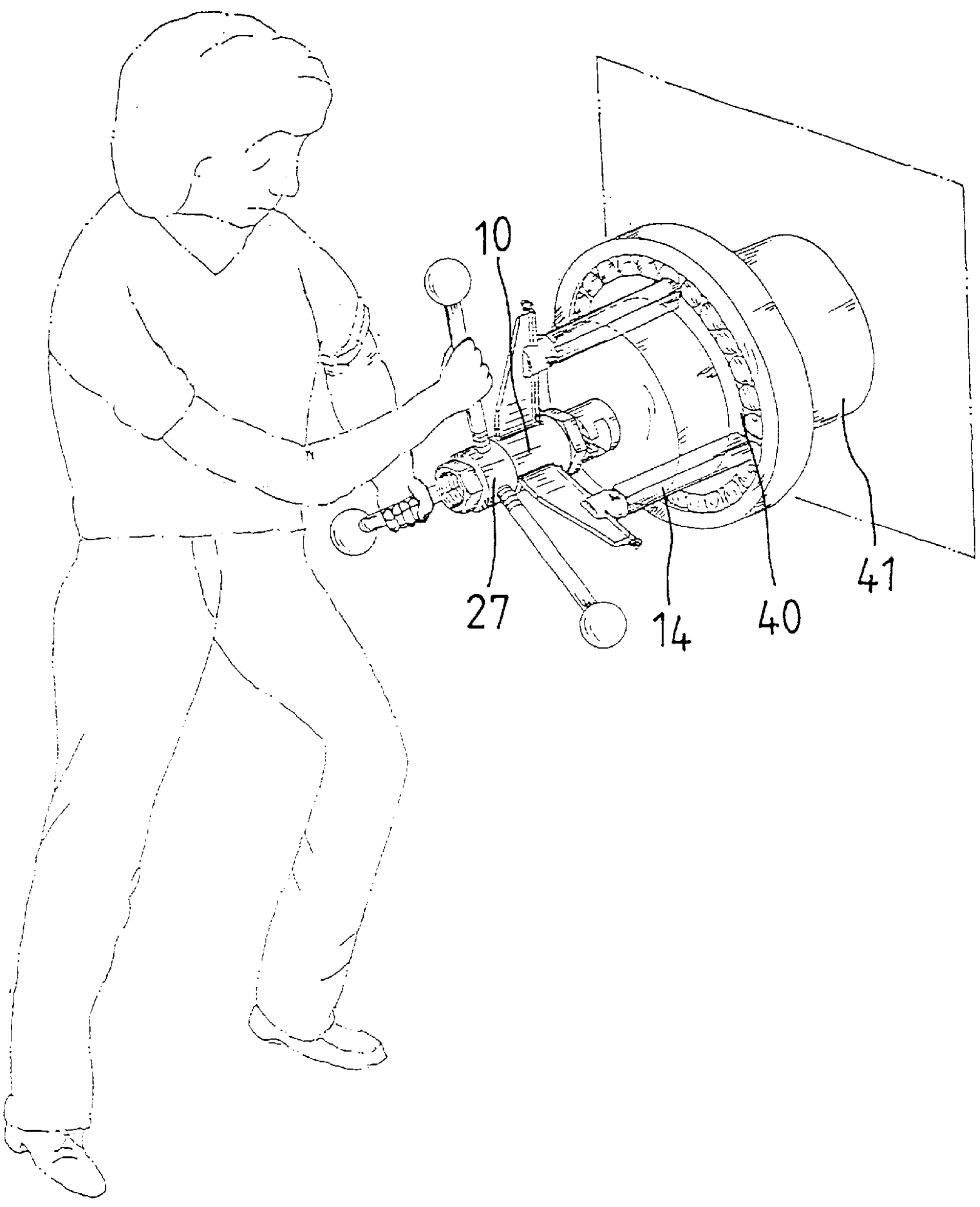
FIG. 10 shows that an operator uses the device of the present invention to install a bearing onto a shaft.

FIG. 9 shows that the device of the present invention pushes the bearing 40 in a tube 400 with a large inner diameter. The threaded portion 32 of the second part 30 extends through the tube 400 and engaged with a transverse board 401 on an end of the tube 400. By this way, the bearing 40 can be moved to a desired position.

Figure 11:
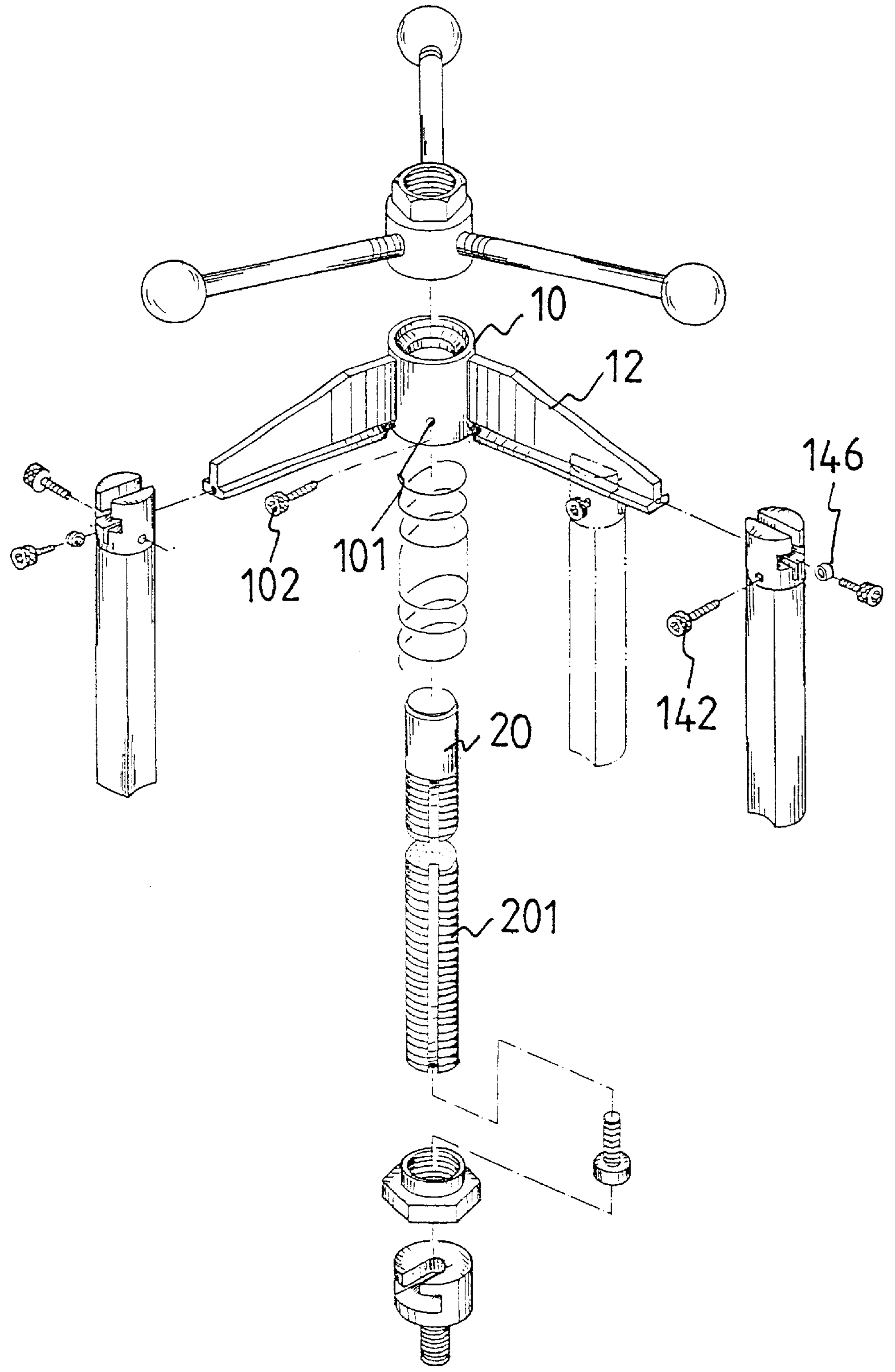
FIG. 11 is an exploded view to show yet another embodiment of the device.
Figure 12:
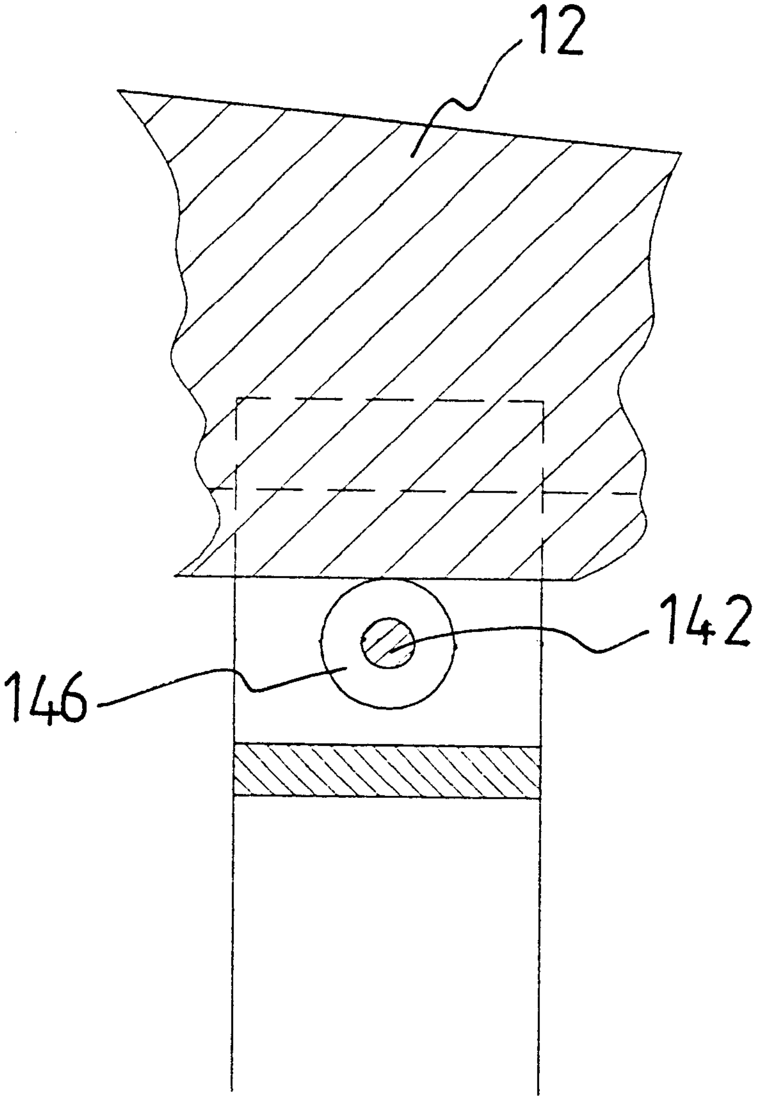
FIG. 12 shows another embodiment of the biasing member between the flanges and the slot of each rod.

FIG. 11 shows that the pushing member 10 has a hole 101 defined radially therethrough and the threaded rod 20 has a groove 201 defined longitudinally in an outside thereof so that a bolt 102 extends through the hole 101 in the pushing member 10 and is engaged with the groove 201 in the threaded rod 20. By this way, the pushing member 10 will not co-rotate with the rotatable member 27. As shown in FIG. 12, the biasing member 146 can be a ring-shaped spring and the bolt 142 extends through the two partitions separated by the slot of each of the rods 14 and the ring-shaped biasing member 146 so that the two partitions clamp the wing 12.

While we have shown and described various embodiments in accordance with the present invention, it should be clear to those skilled in the art that further embodiments may be made without departing from the scope and spirit of the present invention.

What is claimed is:

1. A device for mounting bearings onto a shaft, comprising:

a tubular pushing member having at least two wings extending radially outward therefrom, each of said at least two wings having a rod slidably and perpendicularly connected thereto, a passage defined through said pushing member and an annular flange extending radially inward from an inside of said passage;

a threaded rod extending through said passage and an engaging means on a first end of said threaded rod, said engaging means adapted to be connected to the shaft, a nut threadedly connected to said first end of said threaded rod and a spring urged between said annular flange and said nut, and a rotatable member rotatably contacting said pushing member and threadedly mounted to a second end of said threaded rod.

2. The device as claimed in claim 1 further comprising an end member engaged with a distal end of each of said at least two wings to prevent each of said at least two rods from disengaging from said at least two wings.

3. The device as claimed in claim 1, wherein said engaging means includes a first part connected to said first end of said threaded rod and a second part adapted to be connected to the shaft, said first part having a head and said second part having a concavity defined radially therein so as to receive said head in said concavity.

4. The device as claimed in claim 1, wherein each of said at least two rods has a curved inside which is adapted to contact the shaft.

5. The device as claimed in claim 1, wherein each of said at least one wings has two flanges extending laterally therefrom and each of said at least two rods has a slot defined in a top thereof, two side recesses respectively defined in two inner sides defining said slot and said two flanges received in said two side recesses.

6. The device as claimed in claim 5 further comprising a biasing member received between said flanges and a bottom defining said slot of each of said at least two rods.

7. The device as claimed in claim 5 further comprising a bolt extending through two partitions separated by said slot of each of said at least two rods so that said two partitions clamp respective one of said at least two wings.

8. The device as claimed in claim 7, wherein said biasing member is a ring-shaped spring and said bolt extends through said ring-shaped biasing member.

9. The device as claimed in claim 1, wherein said rotatable member has three bars extending radially outward therefrom.

10. The device as claimed in claim 1, wherein said pushing member has a hole defined radially therethrough and said threaded rod has a groove defined longitudinally in an outside thereof, a bolt extending through said hole in said pushing member and engaged with said groove in said threaded rod.

* * * * *